Figure 1:
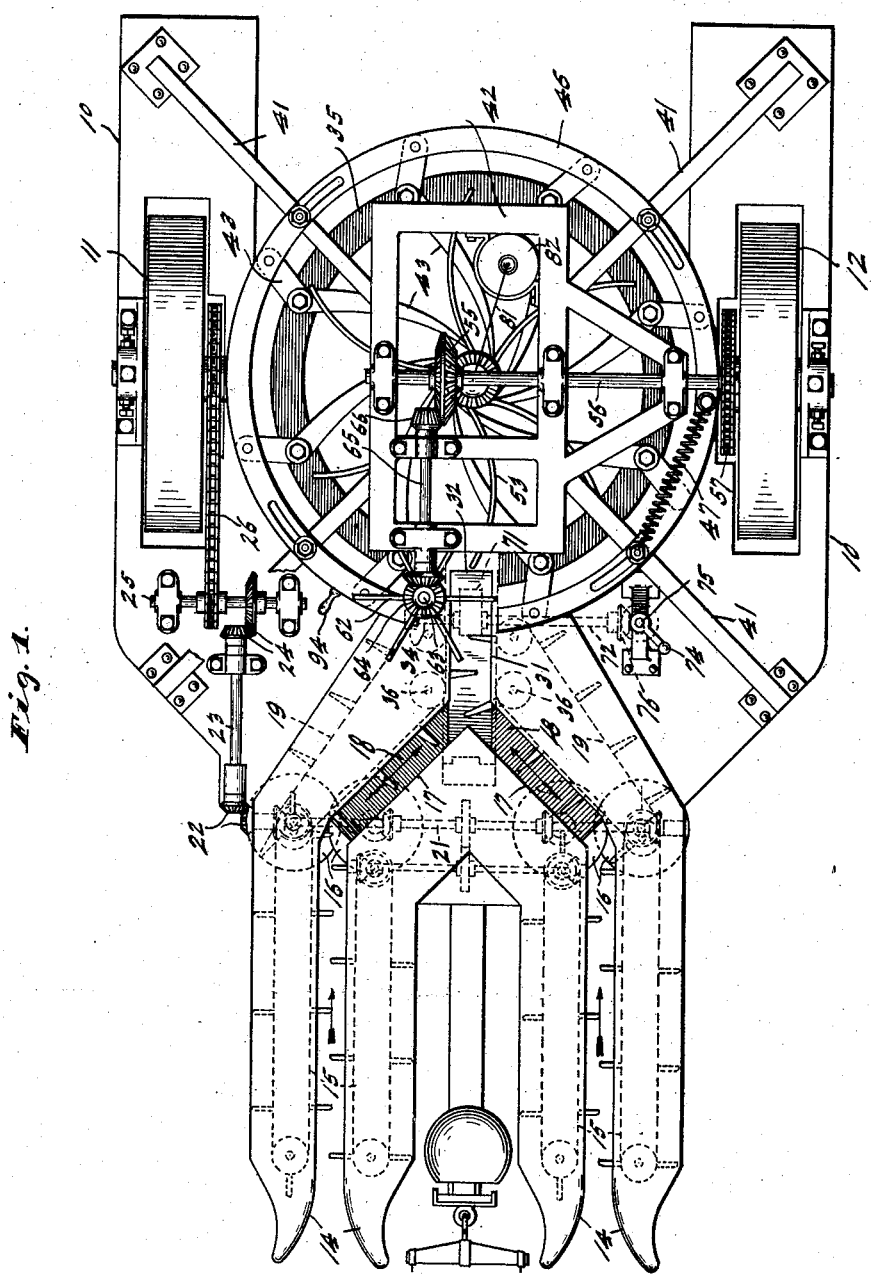

E. M. & R. L. CARTER.
CORN SHOCKER.
APPLICATION FILED APR. 1, 1912.

1,057,219.

Patented Mar. 25, 1913.
3 SHEETS—SHEET 1.

Witnesses
Frank A. Fahle
J. Gasper.

Inventors
Edwin M. Carter, and
Roy L. Carter.
by Arthur M. Hood
Attorney

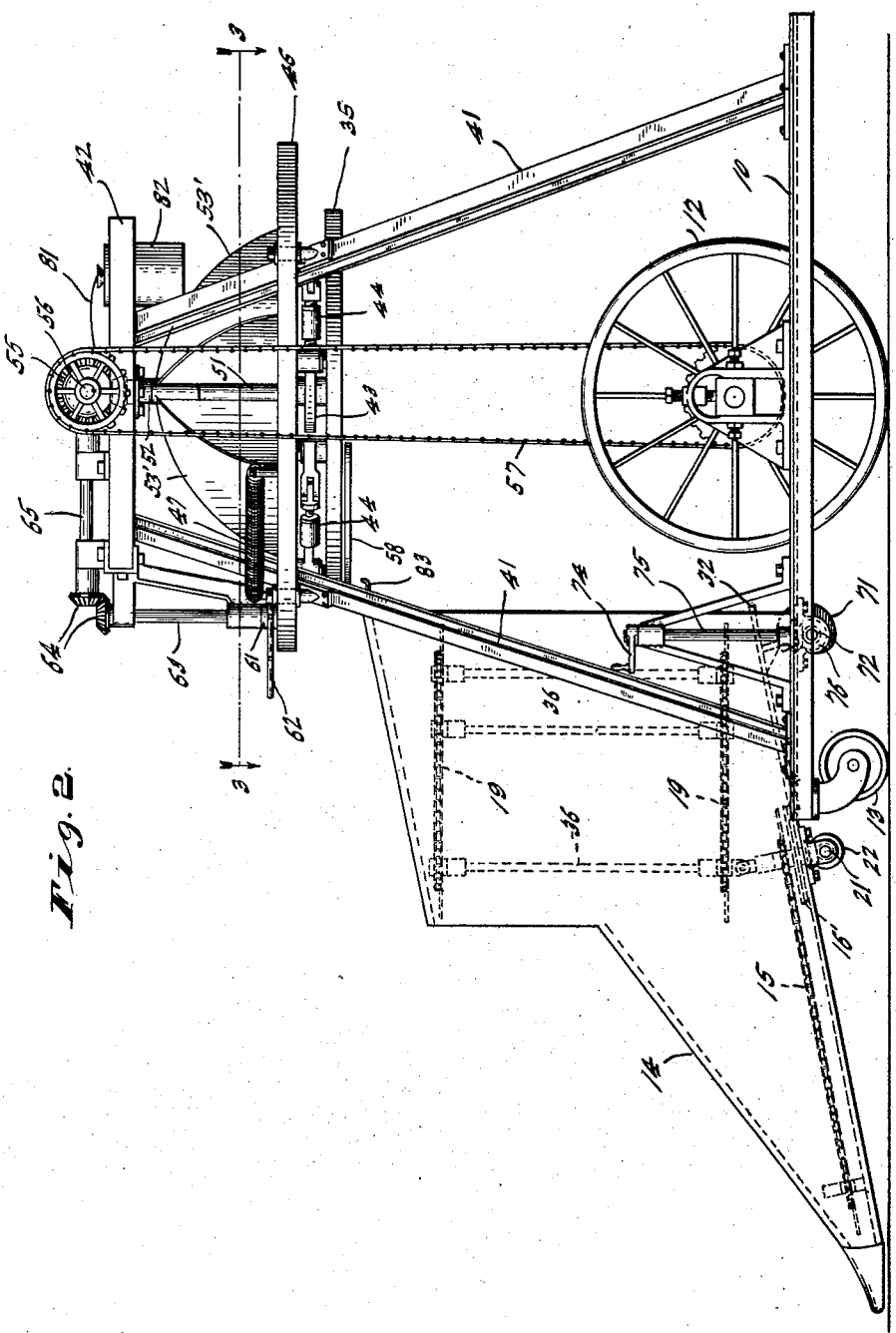

E. M. & R. L. CARTER.
CORN SHOCKER.
APPLICATION FILED APR. 1, 1912.
1,057,219. Patented Mar. 25, 1913.
3 SHEETS—SHEET 3.
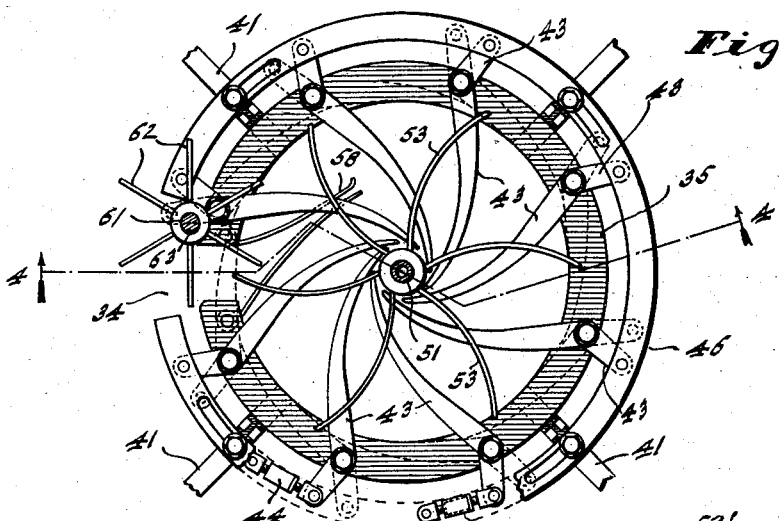
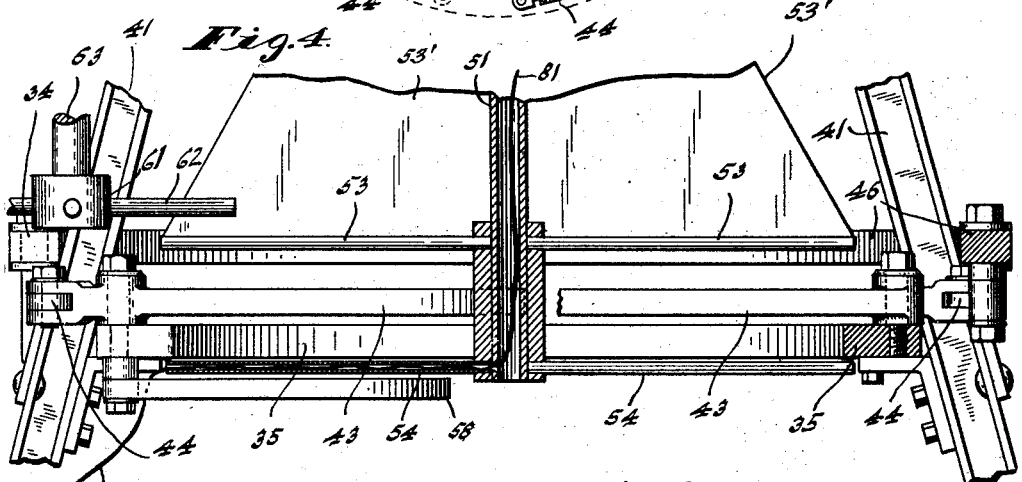
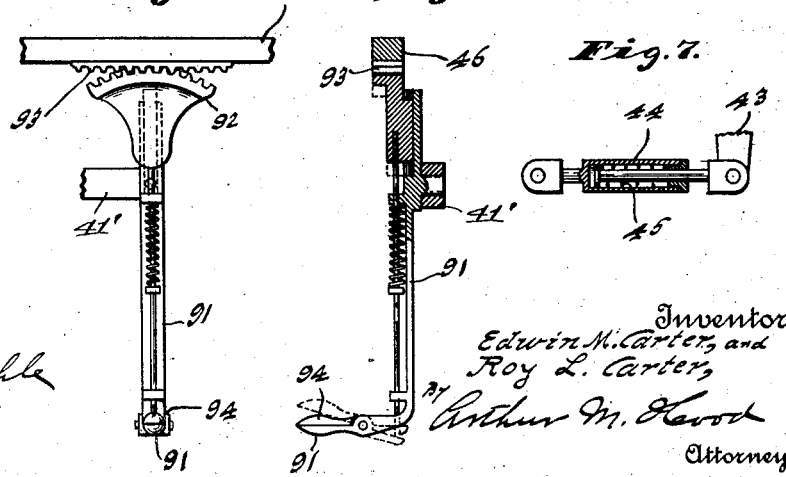
Witnesses
Frank A. Fahle
J. Gasper
Inventors
Edwin M. Carter, and
Roy L. Carter,
by Arthur M. Havok
Attorney

UNITED STATES PATENT OFFICE.

EDWIN M. CARTER AND ROY L. CARTER, OF ROCKVILLE, INDIANA.

CORN-SHOCKER.

1,057,219.  Specification of Letters Patent.  Patented Mar. 25, 1913.

Application filed April 1, 1912. Serial No. 687,762.

*To all whom it may concern:*

Be it known that we, EDWIN M. CARTER and ROY L. CARTER, citizens of the United States, residing at Rockville, in the county of Parke and State of Indiana, have invented a new and useful Corn-Shocker, of which the following is a specification.

The object of our invention is to produce a corn harvester and shocker of such character that the cut stalks may be automatically formed into a substantial shock which, when bound, may be directly dropped to the ground without the necessity of removing any supporting member from beneath the shock. To this end the shock is formed by suspension from an embracing or compressing apparatus which holds the stalks near their upper ends, and, when the shock or bundle is bound, it is released and drops freely to the ground below the suspending structure, and the machine proceeds on its way.

The accompanying drawings illustrate our invention.

Figure 1 is a plan of a machine embodying our invention; Fig. 2 a side elevation; Fig. 3 a section on line 3—3 of Fig. 2; Fig. 4 an enlarged section on line 4—4 of Fig. 3; Fig. 5 an elevation of the lever for swinging the shock forming ring; Fig. 6 a side elevation partly in section of Fig. 5; and Fig. 7 a detail.

In the drawings, 10 indicates a main frame supported upon suitable main wheels 11 and 12, and, if desired, supplemental wheels 13. At the front of the main frame we provide stalk guides 14, 14 of usual form, each straddling a row of stalks and, by means of usual feed chains 15, 15, guiding the stalks properly to a suitable cutting mechanism 16 which, in the drawings, is shown as comprising two co-acting rotary cutting disks of common form. After the stalks are cut they pass, in a substantially upright position, into a guide way 17 provided with a bottom 18 and with flanking feed chains 19 of ordinary form. The stalk guiding and cutting means may be of any common or desired form and, as such constructions are well known, we do not consider it necessary to enter into further detail of description thereof except to say that the feed chains and cutters may be conveniently driven by suitable connections as by a shaft 21 connected by gears 22 with a shaft 23 connected by gears 24 with a shaft 25 connected by a chain 26 with the main wheel 11. The cut stalks are delivered from guides 17 into a guide way 31 provided with a vertically adjustable bottom 32, and flanking this guide-way 31 are the feed chains 19 which deliver the cut stalks through the gap 34 of a binding ring 35. Chains 19 are carried by vertical shafts 36, 36.

The rear end of the main frame 10 is bifurcated, between wheels 11 and 12, and rising from this portion of the main frame is a tower which may be conveniently formed by four struts 41, a connecting frame 42, and the binding ring 35. Pivotally mounted on the ring 35 are several shock-forming arms, or levers, 43, the inner ends of which are so formed as to co-act to produce a shock-forming iris of variable size. Connected to the outer end of each arm 43 is one end of a two-part link 44 which, between its parts, is provided with a compression spring 45. The opposite ends of the several links 44 are pivotally connected to a controlling ring 46 which is rotatably supported on struts 41 and is urged in one direction by a spring 47 so as to normally drive the inner ends of the arms 43 toward a common center. This ring 46 is, of course, provided with a gap registering with gap 34.

Arranged in alinement with the common center of the inner ends of arms 43, is a vertical shaft 51 supported in a suitable bearing 52 carried by frame 42, and this shaft is provided with two sets of radiating arms 53 and 54 between which the arms 43 swing. The upper arms 53 are preferably connected to shaft 51, by plates or partitions 53' so that the upper ends of the cut stalks cannot interlace above said arms. Shaft 51 is connected by gears 55 with a shaft 56 which is connected by a chain 57 with the main wheel 12.

Leading inwardly from opposite sides of gap 34 of ring 35 are two spring guide fingers 58, 58 which will grasp the cut stalks after they leave bottom 32 and support the same until they are caught between an arm 43 and a pair of arms 53—54.

In order to assist in the delivering of cut stalks to the shock-forming members a feed wheel 61 may be provided. This wheel comprises radiating arms 62 which sweep over and along guide-way 31. The wheel is carried by a vertical shaft 63 connected by gears 64 with a shaft 65 carrying a gear 66 which meshes with the gear 55 carried by shaft 56.

The cut stalks will be delivered in successive small bunches, in an upright position, to the arms 53 and 54 and into the iris formed by the swinging arms 43 so as to be thus suspended between the arms 53—54 and 43 and formed into a shock of gradually increasing diameter. This shock should have the butt ends of its outer stalks no higher than the inner stalks and therefore the bottom 32 of guide-way 31 is supported, at its discharge end, upon a cam 71 carried by a shaft 72. Shaft 72 may be manually driven by a lever 74, shaft 75, and gears 76.

In order to bind the shock, one of the arms 54 may be made hollow so as to permit the delivery therethrough of a binding cord or wire 81 brought from a supply box 82 through shaft 51 which is also hollow. When the shock nears the desired size, the end of cord 81 is attached to a hook 83 on one of the struts 41 and shaft 51 then continued for one more turn, thereby inclosing the shock in a length of the cord. The machine is then stopped and the shock is bound and may be dropped directly to the ground by swinging arms 43 so as to increase the size of the iris formed thereby. To accomplish this dropping action, we pivot a lever 91 upon a projection 41' from one of the struts 41. The upper short arm of lever 91 carries a sliding segment 92 which is normally out of engagement with a rack 93 formed on ring 46 and this sliding segment may be projected into engagement with the rack 93 by means of a common detent lever 94 mounted on lever 91 and connected to segment 92, the arrangement being such that, when an operator grasps levers 91 and 94, segment 92 will be projected into engagement with rack 93 and lever 91 may be then swung so as to rotate ring 46 and thus swing the inner ends of arms 43 outwardly and thus permit the shock to drop directly and firmly upon the ground.

We claim as our invention:

1. In a corn handling machine, the combination of a rotary substantially vertical shaft having a plurality of radiating stalk-engaging arms, a plurality of swinging shock-supporting arms arranged around the axis of said shaft and movable toward and from said axis, means for yieldingly urging said shock-supporting arms toward said axis to carry the weight of the forming shock, and means for positively swinging said shock-supporting arms away from said axis to release a shock of stalks, the machine being open below the formed shock to allow it to be dropped to the ground when said shock-supporting arms are swung away from said axis.

2. In a corn handling machine, the combination of a rotary substantially vertical shaft having a plurality of radiating stalk-engaging arms, a plurality of swinging shock-supporting arms arranged around the axis of said shaft and movable toward and from said axis, means for yieldingly urging said shock-supporting arms toward said axis, to carry the weight of a forming shock, and means for releasing the formed shock from said shock-supporting arms, the machine being open below the formed shock to allow it to be dropped to the ground when released from said shock-supporting arms.

3. In a corn harvester, a transportable vehicle comprising stalk cutting mechanism, a rotary substantially vertical shaft having a plurality of radiating stalk-engaging arms, a plurality of swinging arms arranged around the axis of said shaft and movable toward and from said axis, means for yieldingly urging said arms toward said axis, means for positively swinging said arms away from said axis to release a shock of stalks, and means for guiding the cut stalks between the radiating arms of the shaft and the several swinging arms, said guiding means comprising a vertically adjustable member by which the delivery of the cut stalks may be vertically varied.

4. In a corn harvester, a transportable vehicle comprising stalk cutting mechanism, a rotary substantially vertical shaft having a plurality of radiating stalk-engaging arms, a plurality of swinging arms arranged around the axis of said shaft and movable toward and from said axis, means for yieldingly urging said arms toward said axis, and means for guiding the cut stalks between the radiating arms of the shaft and the several swinging arms, said guiding means comprising a vertically adjustable member by which the delivery of the cut stalks may be vertically varied.

5. In a corn harvester, a transportable vehicle comprising stalk cutting mechanism, a rotary substantially vertical shaft having a plurality of radiating stalk-engaging arms, a plurality of swinging shock-supporting arms arranged around the axis of said shaft and movable toward and from said axis, means for yieldingly urging said shock-supporting arms toward said axis to carry the weight of the forming shock, means for positively swinging said shock-supporting arms away from said axis to release a shock of stalks, and means for guiding the cut stalks between the radiating arms of the shaft and the several swinging arms, the machine being open below the formed shock to allow it to be dropped to the ground when said shock-supporting arms are swung away from said axis.

6. In a corn harvester, a transportable vehicle comprising stalk cutting mechanism, a rotary substantially vertical shaft having a plurality of radiating stalk-engaging arms, a plurality of swinging shock-supporting arms arranged around the axis of said shaft and movable toward and from said axis, means for yieldingly urging said shock-supporting arms toward said axis to carry the weight of the forming shock, means for releasing the formed shock from said shock-supporting arms, and means for guiding the cut stalks between the radiating arms of the shaft and the several swinging arms, the machine being open below the formed shock to allow it to be dropped to the ground when it is released from said shock-supporting arms.

7. In a corn harvester, the combination with a transportable vehicle of a stalk-cutting mechanism, an elevated structure comprising means for receiving and suspending successively presented unbound cut stalks and for rotating the entire bundle of such suspended stalks, means for successively delivering the cut stalks in substantially upright position from the cutting mechanism into said suspending structure, and means for releasing and dropping such bundle.

8. In a corn harvester, the combination with a transportable vehicle of an elevated structure comprising means for receiving and suspending successively presented unbound cut stalks and for rotating the entire bundle of such suspended stalks, and means for releasing and dropping such bundle.

9. In a corn handling machine, the combination of a plurality of stalk-suspending compressing members movable toward and from a common vertical bundle axis, means for yieldingly and independently urging said members toward the common axis, means for simultaneously moving said members away from the common axis, and means for rotating a bundle of stalks suspended between said compressing members.

10. In a corn handling machine, the combination of a plurality of stalk-suspending compressing members movable toward and from a common vertical bundle axis in a plane transverse to such axis, means for urging said members toward the common axis, means for simultaneously moving said members away from the common axis, and means for rotating a bundle of stalks suspended between said compressing members.

11. In a corn handling machine, the combination of a plurality of stalk-suspending compressing members movable toward and from a common vertical bundle axis, means for yieldingly and independently urging said members toward the common axis, and means for simultaneously moving said members away from the common axis.

12. In a corn handling machine, the combination of a plurality of stalk-suspending compressing members movable toward and from a common vertical bundle axis in a plane transverse to such axis, means for urging said members toward the common axis, and means for simultaneously moving said members away from the common axis.

13. In a corn harvester, the combination with a transportable vehicle, of a stalk-cutting mechanism, a plurality of stalk-suspending members movable toward and from a common vertical bundle axis, means for yieldingly and independently urging said members toward the common axis, means for simultaneously moving said members away from the common axis, means for delivering the cut stalks from the cutting mechanism into the space between the stalk-suspending members, and means for rotating the suspended bundle of stalks around a vertical axis.

14. In a corn harvester, the combination with a transportable vehicle, of a stalk-cutting mechanism, a plurality of stalk-suspending compressing members movable toward and from a common vertical bundle axis in a plane transverse to such axis, means for urging said members toward the common axis, means for simultaneously moving said members away from the common axis, means for successively delivering the cut stalks in substantially upright position from the cutting mechanism into the space between the stalk-suspending members, and means for rotating the suspended bundle of stalks around a vertical axis.

15. In a corn harvester, the combination with a transportable vehicle, of a stalk-cutting mechanism, a plurality of stalk-suspending compressing members movable toward and from a common vertical bundle axis, means for yieldingly and independently urging said members toward the common axis, means for simultaneously moving said members away from the common axis, and means for delivering the cut stalks from the cutting mechanism into the space between the stalk-suspending members.

16. In a corn harvester, the combination with a transportable vehicle, of a stalk-cutting mechanism, a plurality of stalk-suspending compressing members movable toward and from a common vertical bundle axis in a plane transverse to such axis, means for urging said members toward the common axis, means for simultaneously moving said members away from the common axis, and means for successively delivering the cut stalks in substantially upright position from the cutting mechanism into the space between the stalk-suspending members.

17. In a corn handling machine, the combination of an elevated substantially circular ring having a gap, a plurality of horizontally swinging arms having inner stalk-engaging ends movable toward and from a common vertical bundle-axis, and a rotary structure coöperating with said arms to suspend stalks within the iris formed by said arms.

18. In a corn handling machine, the combination of an elevated substantially circular ring having a gap, a plurality of horizontally swinging arms having inner stalk-engaging ends movable toward and from a common vertical bundle-axis, a controlling ring, spring connections between said controlling ring and the several arms for independently urging said arms inwardly toward the bundle axis, and means for yieldingly urging said controlling ring in one direction.

19. In a corn handling machine, the combination of an elevated substantially circular ring having a gap, a plurality of horizontally swinging arms having inner stalk-engaging ends movable toward and from a common vertical bundle-axis, a controlling ring, spring connections between said controlling ring and the several arms for independently urging said arms inwardly toward the bundle axis, and means for shifting said controlling ring to swing the arms simultaneously away from the bundle axis.

In witness whereof, we have hereunto set our hands and seals at Indianapolis, Indiana, this 26th day of March, A. D. one thousand nine hundred and twelve.

EDWIN M. CARTER. [L. S.]
ROY L. CARTER. [L. S.]

Witnesses:
 ARTHUR M. HOOD,
 FRANK A. FAHLE.

Copies of this patent may be obtained for five cents each, by addressing the "Commissioner of Patents, Washington, D. C."